Aug. 3, 1954 J. M. COYNER 2,685,272
LIVESTOCK CAR FEEDING MECHANISM
Filed Dec. 26, 1951 2 Sheets-Sheet 1
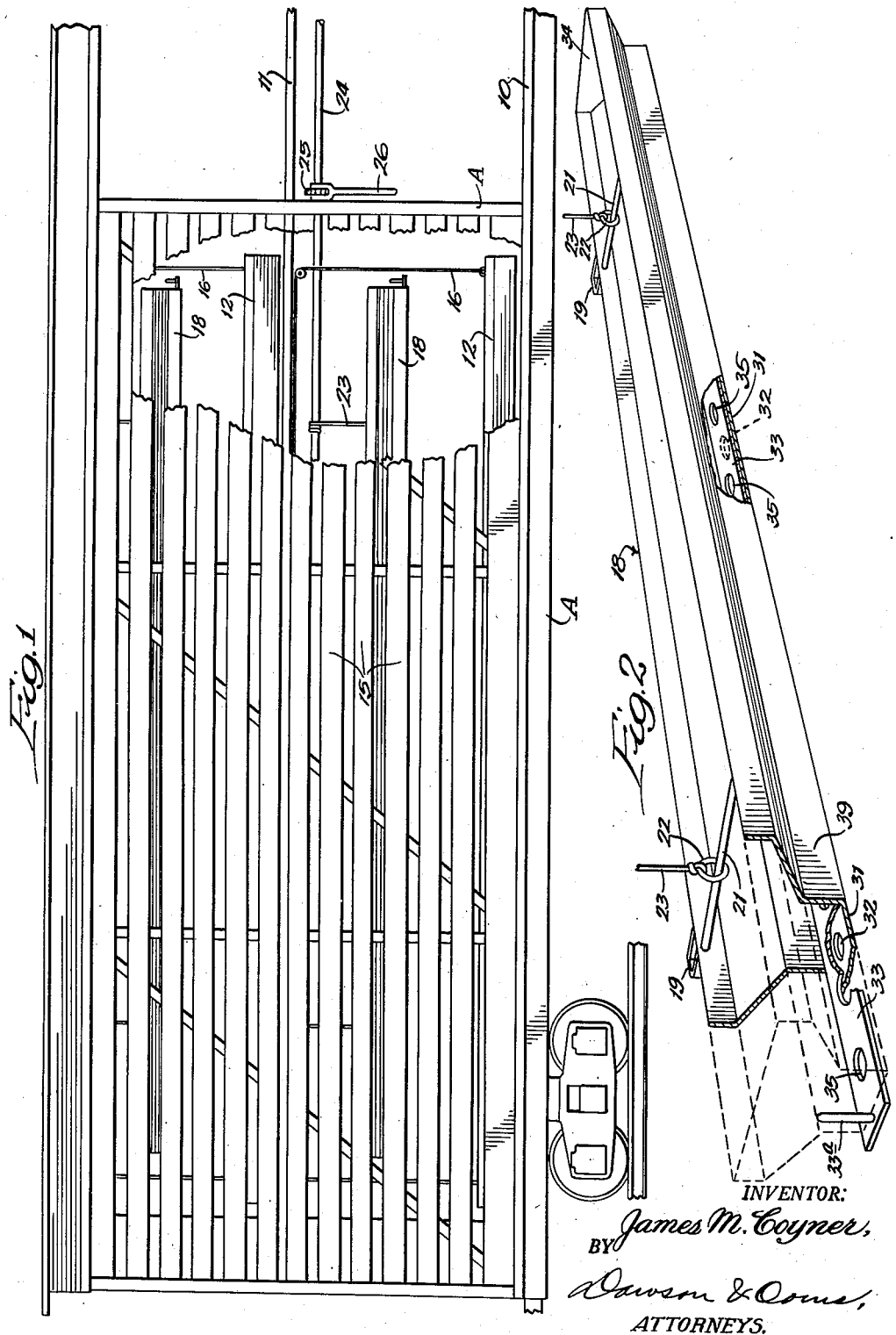
INVENTOR:
James M. Coyner,
BY
Dawson & Ooms,
ATTORNEYS.

Aug. 3, 1954 — J. M. COYNER — 2,685,272
LIVESTOCK CAR FEEDING MECHANISM
Filed Dec. 26, 1951 — 2 Sheets-Sheet 2
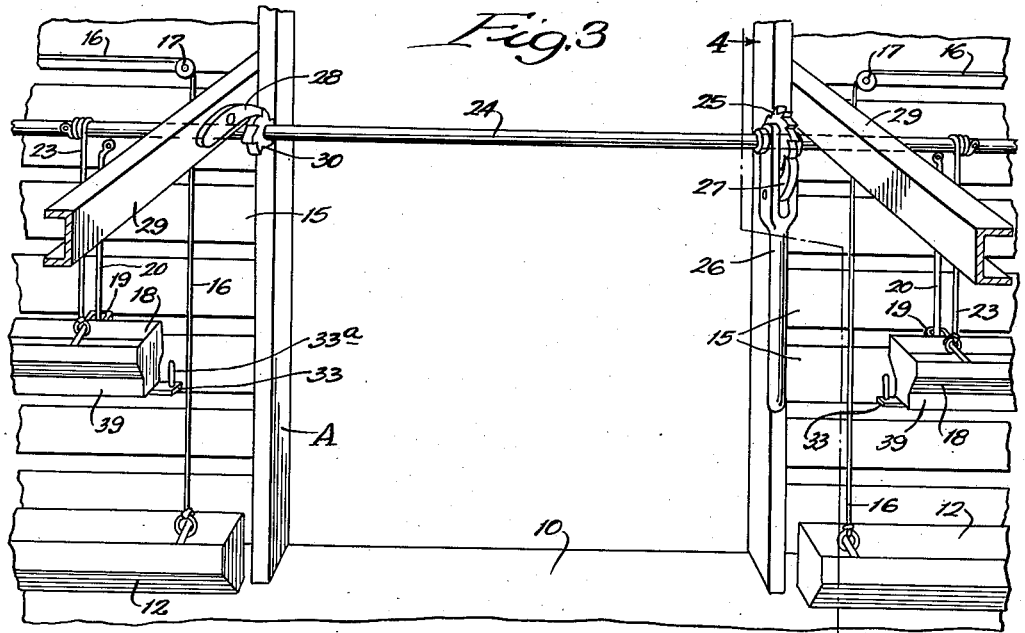
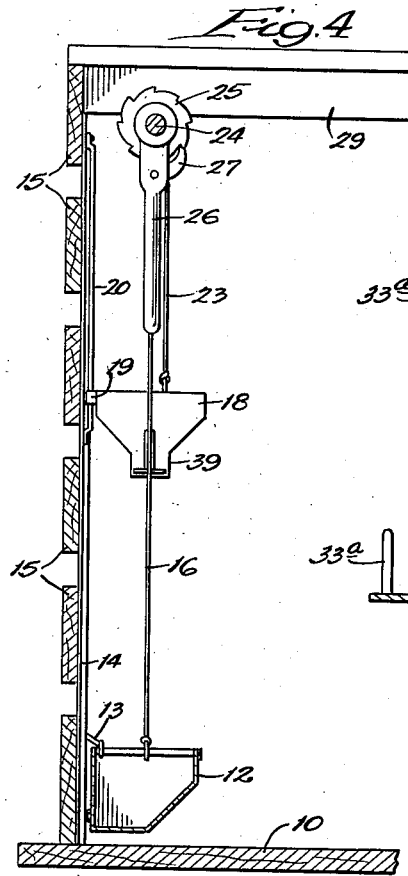
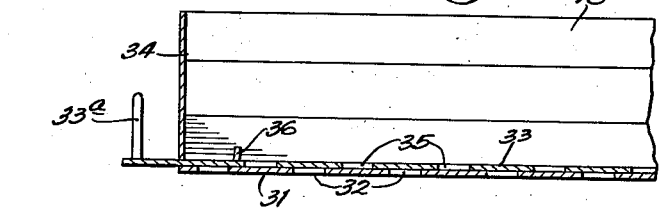
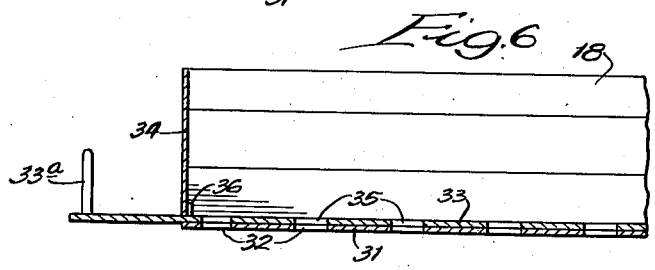
INVENTOR:
James M. Coyner,
BY Dawson & Ooms,
ATTORNEYS.

Patented Aug. 3, 1954

2,685,272

UNITED STATES PATENT OFFICE 2,685,272

LIVESTOCK CAR FEEDING MECHANISM

James M. Coyner, Madison, Wis.

Application December 26, 1951, Serial No. 263,296

5 Claims. (Cl. 119—10)

This invention relates to livestock car feeding mechanism. The invention is particularly useful in the feeding of grain and the like within livestock cars. The cars may consist of livestock railway cars and livestock cars in the nature of trucks and other vehicles in which livestock is transported.

A problem is presented in feeding hogs, cattle, sheep and other livestock being transported in livestock cars, because of the relatively crowded condition of stock within the cars and the need for supplying evenly distributed amounts of feed for stock while being transported, while at the same time avoiding spillage of the grain, etc. Since the feeding has to be accomplished at times when the vehicle is traveling at high speed, accurate feeding without spillage is rendered extremely difficult.

An object of the present invention is to provide a livestock car equipped with feeding mechanism which accomplishes the above-stated desired results. A further object is to provide mechanism within a livestock car enabling grain or other feed to be transferred effectively from one container to a feed trough to effect even distribution therein, while at the same time avoiding spillage even though the vehicle is traveling at high speed. A still further object is to provide improved forms of feeding mechanism for livestock cars enabling the feed to be accurately placed for the livestock with a minimum of effort and with accurate distribution. Other specific objects and advantages will appear as the specification proceeds.

The invention is shown in an illustrative embodiment, by the accompanying drawings, in which—

Figure 1 is a broken, side view in elevation of a portion of a railway car adapted for the transportation of livestock;

Fig. 2, an enlarged broken, perspective view of a grain container or feed container useful in the carrying out of my invention;

Fig. 3, an enlarged broken, perspective view of an inner wall portion of the car and of the feed equipment supported therein;

Fig. 4, a vertical, sectional view, the section being taken as indicated at line 4—4 of Fig. 3;

Fig. 5, an enlarged broken, longitudinal, sectional view of the feed container showing the bottom of the container closed; and Fig. 6, a view similar to Fig. 5, but showing the bottom of the container open to permit the discharge of feed therefrom.

In the illustration given, A designates a railway car. The car may be any type of vehicle employed for the transportation of livestock such as, for example, trucks and other self-propelled vehicles. In the railway car illustrated, the car is provided with two floors, 10 and 11, providing two spaced compartments adapted to receive sheep, hogs, etc. The upper floor 11 will be omitted when larger animals, such as cattle, are conveyed.

In each compartment there is mounted a feed trough 12 equipped with link means 13 for slidably connecting the trough to guides 14 extending vertically of the compartment, the guides 14 being attached to the slats 15 of the car. A cable 16 is secured to the trough and passes over a series of pulleys 17 to compensating weights, whereby one may readily raise or lower the trough 12 with a minimum of effort.

Above the trough 12 is a longitudinally-extending feed container or trough 18. The container is provided on its inner side with metal loops 19 slidably engaging guide rods 20 secured to the slats 15 of the car, whereby the container 18 may be guided for vertical movement. The container or bin 18 is provided, at intermediate points, with transverse rods 21 receiving rings 22 to which is secured a flexible cable 23. The cables 23 are secured at their upper ends to a rotatable hoist rod 24. If desired, the hoist rod 24 may extend the entire length of the car, as shown in the illustration, or separate hoist rods may be used for each side of the car.

Any suitable means for rotating the rod 24 to elevate the containers 18 may be employed. In the illustration given more clearly in Fig. 3, I equip the rod 24 with a fixed ratchet gear 25 and provide a lever 26 equipped with a ratchet tooth 27 for thus rotating the rod. A pawl 28 may be pivotally supported upon a cross beam 29 for engaging a ratchet wheel 30 also secured to rod 24 to hold the rod against rotation in the opposite direction while the ratchet lever is being retracted. This structure is found to be very effective in quick raising of the feed bins or containers, but it will be understood that other means for raising the containers may be employed.

As already pointed out, it is of great importance that the grain or other feed within the longitudinally-extending container 18 be evenly deposited within the feed trough below. To accomplish this result, I provide the bottom wall 31 of the container 18 with a series of spaced ports 32, as shown more clearly in Figs. 5 and 6. Slidably mounted upon the bottom wall 31 of the container 18 is a slide valve member 33 extending through a slot at the bottom of an end wall 34 of the container 18. The slide member 33 is provided with spaced apertures 35 adapted to be brought into alignment with the ports 32 of the bottom wall 31, as shown more clearly in Fig. 6, and the slide 33 may be provided with a stop 36 to aid the operator in aligning the openings 32 and 35.

While the feed container 18 may be of any desired shape, I prefer to have the side walls of the feed container tapered, as shown more clearly in Fig. 4, and with the central portion of the container forming a reduced lower end portion 39, so that the valve-controlled portion of the container will extend centrally within the lower trough 12 when grain or other feed is being dispensed into the lower trough 12.

Operation

Since the operation of the structures shown in the two separate compartments are identical, it will be sufficient to describe the operation of the feed trough and feed container in a single compartment.

In the initial operation, the pawl 28 is released to allow the feed container 18 to be lowered to the position shown in Fig. 4, where the operator can readily pour grain or other feed into the container 18. Immediately after filling the container 18, the ratchet lever 26 is operated to elevate the feed container or containers to a position at the top of the compartment. Here the containers 18 are out of the way. If desired, the lower trough or container 12 may be initially filled with feed at the start of the journey. When, later, the trough needs refilling, it is elevated quickly to the top of the compartment immediately below the container 18. Thus, both containers are brought together so that the discharge of grain from the container 18 is accomplished centrally of the lower container or trough 12, eliminating the possibility of spillage. To distribute the grain or other feed evenly along the elongated trough 12, the operator draws the handle 33a of the slide valve member 33 and the grain flows evenly at spaced intervals into the trough 12. After pushing the slide bar 33 inwardly to closed position, as illustrated in Fig. 5, the trough 12 may then be lowered to a position upon the floor so that the livestock ranged along the trough may each eat from the trough. After the feeding operation, the trough 12 is again elevated to the top of the compartment and below the upper trough or feed container and thus protecting the animals from contact with either of the containers or troughs.

While in the foregoing specification, I have set forth specific structures in considerable detail for the purpose of illustrating embodiments of the invention, it will be understood that such details of structure may be varied widely by those skilled in the art, without departing from the spirit of my invention.

I claim:

1. In a livestock vehicle, a feed trough extending along one side of said vehicle, a longitudinally-extending feed container above said trough and having a reduced lower portion adapted to be received within said trough when the container is lowered there-into, a hoist supported upon said vehicle above said trough for raising and lowering said feed container in a vertical plane above said trough, and valve means in the lower portion of said feed container for releasing feed from said container into said trough.

2. In a livestock vehicle, an elevator along one side wall of the vehicle, a feed container carried by said elevator for movement in a vertical direction, said feed container having apertures in the bottom thereof, a valve having apertures therein alignable with the apertures in the bottom of said feed container for controlling the flow of feed through said apertures along the length of said feed container, and a trough below said feed container and mounted for movement in a vertical plane aligned with the plane of movement of said feed container, said trough having the upper portion thereof of greater cross-sectional area than the bottom portion of said container, a hoist supported upon said vehicle for raising and lowering said trough to bring the trough into telescopic engagement with said feed container for receiving feed from said container.

3. In a livestock vehicle having side walls, a trough extending along one side wall and guided therein for vertical movement and equipped at its bottom with a discharge valve, a feed container extending above said trough and guided along said wall for vertical movement, and elevator means on said vehicle for selectively raising and lowering said trough and container, said container having a reduced lower portion adapted to be received within the trough when said trough and container are brought together to permit the discharge of feed from the trough into the container.

4. In a livestock vehicle having side walls, guides mounted on said side walls, a trough mounted on one of said guides for vertical movement, a feed container mounted on another of said guides above said trough for vertical movement, elevator means on said vehicle for raising and lowering said trough, and elevator means on said vehicle, independent of said first-mentioned elevator means, for raising and lowering said container, said container having a lower portion of smaller cross-sectional area than the upper portion of said trough, whereby said feed container may be lowered to a position directly over said trough and centered therewith for the dispensing of feed into said trough.

5. In a livestock vehicle having a side wall, a trough supported along said side wall for vertical movement, a feed container supported above said trough for vertical movement, said feed container having a lower portion of smaller cross-sectional area than the upper portion of said trough and having spaced apertures in the bottom thereof, a slide valve having apertures mounted upon said bottom and movable thereon to open and close the aperture of said container along the length thereof, and independent elevator means mounted on said vehicle for raising and lowering said trough and container selectively, whereby said container may be brought into telescopic proximity with said trough while the trough is in elevated position for discharge therethrough.

References Cited in the file of this patent

UNITED STATES PATENTS

| Number | Name | Date |
|---|---|---|
| 254,442 | Pentz | Feb. 28, 1882 |
| 276,595 | Joiner | May 1, 1883 |
| 316,859 | Agee | Apr. 28, 1885 |
| 321,860 | Sell | July 7, 1885 |
| 324,531 | Carter | Aug. 18, 1885 |
| 1,109,009 | O'Brien | Sept. 1, 1914 |